(12) United States Patent
Vigholm et al.

(10) Patent No.: US 11,635,095 B2
(45) Date of Patent: Apr. 25, 2023

(54) HYDRAULIC SYSTEM AND A METHOD FOR CONTROLLING A HYDRAULIC SYSTEM OF A WORKING MACHINE

(71) Applicant: Volvo Construction Equipment AB, Eskilstuna (SE)

(72) Inventors: Bo Vigholm, Stora Sundby (SE); Johan Hallman, Eskilstuna (SE); Patrik Stener, Torshälla (SE)

(73) Assignee: Volvo Construction Equipment AB, Eskilstuna (SE)

( * ) Notice: Subject to any disclaimer, the term of this patent is extended or adjusted under 35 U.S.C. 154(b) by 42 days.

(21) Appl. No.: 17/606,459

(22) PCT Filed: Apr. 26, 2019

(86) PCT No.: PCT/EP2019/060791
§ 371 (c)(1),
(2) Date: Oct. 26, 2021

(87) PCT Pub. No.: WO2020/216453
PCT Pub. Date: Oct. 29, 2020

(65) Prior Publication Data
US 2022/0196039 A1  Jun. 23, 2022

(51) Int. Cl.
*F15B 13/02* (2006.01)
*F15B 13/044* (2006.01)
(Continued)

(52) U.S. Cl.
CPC .......... *F15B 13/024* (2013.01); *E02F 9/2292* (2013.01); *F15B 13/044* (2013.01);
(Continued)

(58) Field of Classification Search
CPC ............ F15B 21/87; F15B 2211/20576; F15B 2211/20592; F15B 2211/20515; E02F 9/2292
See application file for complete search history.

(56) References Cited

U.S. PATENT DOCUMENTS

| 7,234,298 B2 * | 6/2007 | Brinkman | ............... F15B 7/006 60/475 |
| 7,712,309 B2 | 5/2010 | Vigholm | |

(Continued)

FOREIGN PATENT DOCUMENTS

| DE | 102012102091 A1 | 9/2013 | |
| DE | 102016217541 A1 * | 3/2018 | .............. F15B 11/17 |

(Continued)

OTHER PUBLICATIONS

International Search Report and Written Opinion of the International Searching Authority, PCT/EP2019/060791, dated Jan. 31, 2020, 12 pages.

*Primary Examiner* — Thomas E Lazo
(74) *Attorney, Agent, or Firm* — Sage Patent Group

(57) ABSTRACT

A hydraulic system for a working machine includes a first electric machine connected to a first hydraulic machine; a second electric machine connected to a second hydraulic machine, an output side of the second hydraulic machine being connected to an input side of the first hydraulic machine; at least one hydraulic consumer hydraulically coupled to an output side of the first hydraulic machine via a supply line and configured to be powered by the first hydraulic machine; and a valve arrangement arranged between the hydraulic consumer and the first and second hydraulic machines, wherein the valve arrangement is configured to control a return flow of hydraulic fluid from the hydraulic consumer to either the input side of the first (Continued)

hydraulic machine or an input side of the second hydraulic machine based on a requested output pressure from the first hydraulic machine.

15 Claims, 4 Drawing Sheets

(51) Int. Cl.
*E02F 9/22* (2006.01)
*F15B 21/08* (2006.01)

(52) U.S. Cl.
CPC ... *F15B 21/087* (2013.01); *F15B 2211/20576* (2013.01); *F15B 2211/20592* (2013.01); *F15B 2211/88* (2013.01)

(56) References Cited

U.S. PATENT DOCUMENTS

| | | | | |
|---|---|---|---|---|
| 8,033,107 B2* | 10/2011 | Tikkanen | ................ | F15B 7/006 60/486 |
| 2012/0055149 A1* | 3/2012 | Vonderwell | ............. | F15B 7/006 60/486 |

FOREIGN PATENT DOCUMENTS

| | | |
|---|---|---|
| EP | 2824334 A1 | 1/2015 |
| KR | 20180110800 A | 10/2018 |
| WO | 2012030495 A2 | 3/2012 |
| WO | 2012055579 A1 | 12/2013 |

* cited by examiner

HYDRAULIC SYSTEM AND A METHOD FOR CONTROLLING A HYDRAULIC SYSTEM OF A WORKING MACHINE

CROSS REFERENCE TO RELATED APPLICATIONS

This application is a 35 U.S.C. § 371 national stage application of PCT International Application No. PCT/EP2019/060791 filed on Apr. 26, 2019, the disclosure and content of which is incorporated by reference herein in its entirety.

TECHNICAL FIELD

The invention relates to a hydraulic system and a method for controlling a hydraulic system of a working machine. In particular, the method and system relate to a hybrid drive system comprising an internal combustion engine and a plurality of electrical machines.

The invention is applicable on working machines within the fields of industrial construction machines or construction equipment, in particular wheel loaders. Although the invention will be described with respect to a wheel loader, the invention is not restricted to this particular machine, but may also be used in other working machines such as articulated haulers, excavators and backhoe loaders.

BACKGROUND

In connection with transportation of heavy loads, e.g. in construction work, work machines are frequently used. A work machine may be operated with large and heavy loads in areas where there are no roads, for example for transports in connection with road or tunnel building, sand pits, mines and similar environments.

Work machines commonly employ a hydraulic system for providing power to functions such as steering and lifting. The hydraulic system may for example be powered by the internal combustion engine via a power take-off connected to an output shaft of the engine.

To improve the fuel efficiency of the working machine, a hybrid hydraulic system can be used. One interesting approach is to provide a hydraulic hybrid system comprising an electrical machine for providing power to the hydraulic system. By combining the electric machine with an energy storage, energy can be recuperated and stored during certain operations to be used when required.

A typical wheel loader operation includes simultaneous operation with the two main subsystems of the motion system—driveline and work hydraulics. Since both systems are directly coupled to the engine shaft the interaction of the systems can be problematic.

Accordingly, it is desirable to further improve the efficiency of a hybrid hydraulic system.

SUMMARY

An object of the invention is to provide an improved electric hybrid hydraulic system for a working machine.

According to a first aspect of the invention, there is provided a hydraulic system for a working machine. The hydraulic system comprises: a first electric machine connected to a first hydraulic machine; a second electric machine connected to a second hydraulic machine, an output side of the second hydraulic machine being connected to an input side of the first hydraulic machine; at least one hydraulic consumer hydraulically coupled to an output side of the first hydraulic machine via a supply line and configured to be powered by the first hydraulic machine; and a valve arrangement arranged between the hydraulic consumer and the first and second hydraulic machines, wherein the valve arrangement is configured to control a return flow of hydraulic fluid from the hydraulic consumer to either the input side of the first hydraulic machine or an input side of the second hydraulic machine based on a requested output pressure from the first hydraulic machine.

That the first electric machine is connected to the first hydraulic machine means that an output shaft of the electric machine is mechanically connected to an input shaft of the hydraulic machine such that the electric machine may operate as either a motor providing power to the hydraulic machine or as a generator generating power received from the hydraulic machine. The same applies for the second electric machine and the second hydraulic machine. It can further be assumed that the first and second electrical machines are connected to an electrical power supply and/or energy storage.

The present invention is based on the realization that by configuring the valve arrangement to determine if the return flow is directed to the first or second hydraulic machine based on a requested pressure, the second hydraulic machine may support the first hydraulic machine when required. This brings the advantage that the first and second hydraulic machines and the first and second electrical machines can be designed to together fulfill the maximum torque and pressure requirements of the hydraulic consumers as a sum of the two component groups and not individually. The described system can thereby be made using smaller components, i.e. components having lower capacity compared to if only one component group would be used, thereby providing an advantage in terms of system installation and integration.

Moreover, the described system offers flexibility in that it is also capable of providing an additional hydraulic flow from the second hydraulic machine to the first hydraulic machine if required by the hydraulic consumer, i.e. if the return flow is not sufficient for the first hydraulic machine to providing a requested flow. A further advantage of the described system is that it offers redundancy in the hydraulic system, meaning that if one of the first and second electric or hydraulic machines should malfunction, the hydraulic system can still be operated, even if it may be at reduced capacity. This may help an operator to finish a task in a safe manner and to reach a service location without the need for additional assistance or on-site repairs.

According to the claimed invention, the second hydraulic machine can be seen as providing a pressure boost to the first hydraulic machine, and from the perspective of the electrical machines, the second hydraulic machine can be considered to provide a torque boost to the first hydraulic machine.

According to one embodiment of the invention, the valve arrangement may comprise at least one controllable relief valve. Thereby, the valve arrangement can be controlled to direct the flow to the input side of the first or second hydraulic machine by controlling a threshold pressure of the controllable relief valve. The controllable relief valve may for example be an electrically controllable relief valve. It should however be noted that the valve arrangement may be configured in many different ways while still achieving the described effect. A controllable relief may however be advantageous in that it is easy to use and the relief pressure can be controlled either mechanically or electronically.

According to one embodiment of the invention, the valve arrangement is configured to direct the return flow to the input side of the second hydraulic machine if the requested output pressure from the first hydraulic machine exceeds a threshold pressure. The threshold pressure may for example be a maximum output pressure of the first hydraulic machine. The threshold pressure may also be set so that the first electrical machine and the first hydraulic machine may operate with the highest possible efficiency. Accordingly, when a pressure request from the hydraulic consumer is higher than the threshold pressure, return flow can be redirected to the input side of the second hydraulic machine. The second hydraulic machine is then operated to elevate the pressure and to provide the pressurized flow to the input side of the first hydraulic machine, which in turn elevates the pressure to the pressure level requested by the hydraulic consumer. Thereby, the first hydraulic machine is supported by the second hydraulic machine to provide an output pressure above the threshold pressure.

According to one embodiment of the invention, the second hydraulic machine is configured to provide a pressure to the input side of the first hydraulic machine corresponding to a difference in pressure between the requested output pressure and the threshold pressure of the first hydraulic machine. Thereby, the requested pressure is provided by the combined pressures of the first and second hydraulic machines. The pressure provided by the second hydraulic machine may also take any pressure losses in the first hydraulic machine into account.

According to one embodiment of the invention, the at least one hydraulic consumer may be one of a steering cylinder, a lift cylinder and a tilt cylinder of a working machine. Thereby, the described hydraulic system can be used in a working machine such as a wheel loader, and the advantages of the hydraulic system results in more efficient operation of the working machine. There is also provided a working machine comprising a hydraulic system according to any one of the aforementioned embodiments.

According to a second aspect of the invention, there is provided a method for controlling a hydraulic system of a working machine, the system comprising: a first electric machine connected to a first hydraulic machine; a second electric machine connected to a second hydraulic machine, an output side of the second hydraulic machine being connected to an input side of the first hydraulic machine; at least one hydraulic consumer hydraulically coupled to an output side of the first hydraulic machine via a supply line and configured to be powered by the first hydraulic machine; and a valve arrangement arranged between the hydraulic consumer and the first and second hydraulic machines. The method comprises: controlling the valve arrangement to direct a return flow of hydraulic fluid from the hydraulic consumer to either the input side of the first hydraulic machine or an input side of the second hydraulic machine based on a requested output pressure from the first hydraulic machine.

According to one embodiment of the invention, the method may further comprise: receiving a requested pressure to be provided by the first hydraulic machine; if the requested pressure is lower than a threshold pressure, controlling the valve arrangement to direct the return flow of hydraulic fluid from the hydraulic consumer to the input side of the first hydraulic machine; and if the requested pressure is higher than the threshold pressure, controlling the valve arrangement to direct the return flow of hydraulic fluid from the hydraulic consumer to the input side of the second hydraulic machine and controlling the second hydraulic machine to provide a pressurized flow to the input side of the first hydraulic machine. Thereby, the valve arrangement is controlled based on the pressure requested from the first hydraulic machine so that the return flow is only directed to the second hydraulic machine when the requested pressure exceeds the threshold pressure.

According to one embodiment of the invention, the method further comprises, for a requested pressure higher than the threshold pressure, controlling the valve arrangement to gradually redirect the flow from the input side of the first hydraulic machine to the input side of the second hydraulic machine using a ramp. By controlling the operation of the valve arrangement to gradually redirect a flow, a smooth transition can be achieved where no sudden pressure changes occur. This may both increase the safety of operation of the hydraulic consumer as well as the comfort of an operator of the hydraulic system. In a similar manner, the valve arrangement may be controlled to provide a smooth transition also when redirecting the return flow from the input of the second hydraulic machine to instead go to the input of the first hydraulic machine.

Further effects and features of this second aspect of the present invention are largely analogous to those described above in connection with the first aspect of the invention.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

DETAILED DESCRIPTION OF EXAMPLE EMBODIMENTS OF THE INVENTION

In the present detailed description, various embodiments of a hydraulic system and a method for controlling a hydraulic system according to the present invention are mainly discussed with reference to a hydraulic hybrid system in a wheel loader, where the hydraulic consumers are illustrated as hydraulic cylinders. It should however be noted that this by no means limits the scope of the present invention since the described hydraulic system is equally applicable in other application and for other types of working machines.

Figure 1:
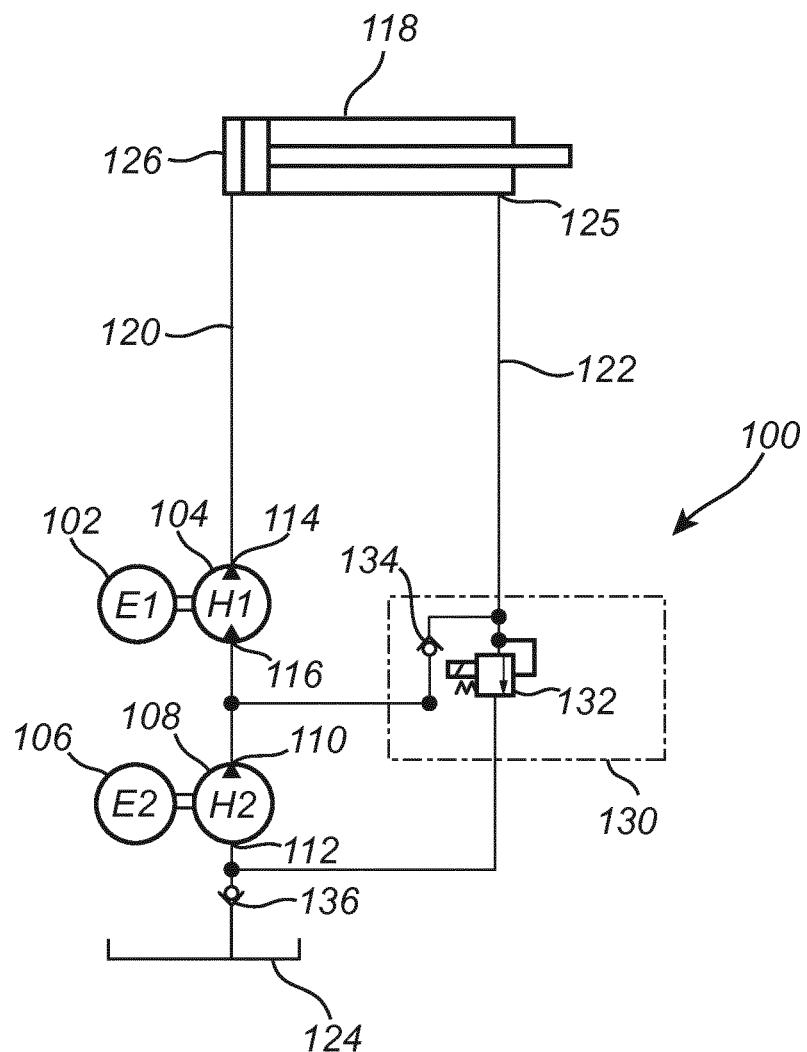
FIG. 1 is a schematic illustration of a hydraulic system according to an embodiment of the invention.

FIG. 1 schematically illustrates a hydraulic system 100 for a working machine such as a wheel loader. The hydraulic system 100 comprises a first electric machine 102 connected to a first hydraulic machine 104 and a second electric machine 106 connected to a second hydraulic machine 108, wherein an output side 110 of the second hydraulic machine 108 is connected to an input side 116 of the first hydraulic machine 104. The first and second hydraulic machines 104, 108 are here illustrated as fixed displacement hydraulic machines. However, it is equally possible to operate the described system with variable displacement hydraulic machines. If variable displacement hydraulic machines are used, it is further needed to provide control signals to the hydraulic machines to control the pressure provided.

The hydraulic system 100 further comprises at least one hydraulic consumer 118 hydraulically coupled to an output side 114 of the first hydraulic machine 104 via a supply line 120 and configured to be powered by the first hydraulic machine 104. The hydraulic consumer 118 is here represented by a hydraulic cylinder 118 having a piston side 126 connected to the output side 114 of the first hydraulic machine 104 and a piston rod side 125 which is connected to a first return line 122 hydraulically coupling the hydraulic consumer 118 to an input side 116 of the first hydraulic machine 104 via a valve arrangement 130.

The valve arrangement 130 is arranged between the hydraulic consumer 118 and a respective input side 116, 112 of the first and second hydraulic machines 104, 108. The valve arrangement 130 is configured to control a return flow of hydraulic fluid from the hydraulic consumer 118 to either the input side 116 of the first hydraulic machine 104 or to the input side 112 of the second hydraulic machine 108 based on a requested output pressure from the first hydraulic machine 104.

As illustrated in FIG. 1, the valve arrangement 130 comprises a controllable relief valve 132 which may be provided in the form of an electrically controllable relief valve 132. The valve arrangement 130 is advantageously configured to direct the return flow to the input side 112 of the second hydraulic machine 108 if the requested output pressure from the first hydraulic machine 104 exceeds a threshold pressure, where the threshold pressure may be a maximum output pressure of the first hydraulic machine 104.

The requested pressure from the first hydraulic machine 104 may based on a requested function from a vehicle operator, such as turning the wheel loader, lifting a load, or any other operation requiring hydraulic power. The request is translated into a pressure to be provided by the first hydraulic machine 104 and the valve arrangement 130 is controlled based on a comparison between the requested pressure and the threshold pressure of the first hydraulic machine 108.

The valve arrangement 130 further comprises a check valve 134 arranged between the return line 122 from the hydraulic consumer 118 and the input side 116 of the first hydraulic machine 104. The check valve 134 allows a flow from the return line to the first hydraulic machine when the controllable relief valve 132 is closed. The pressure required for opening the controllable relief valve 132 can thus be controlled so that the flow from the return line is directed to either of the first and second hydraulic machines 104, 108.

FIG. 1 further illustrates that the hydraulic system comprises a check valve 136 arranged between the input side 112 of the second hydraulic machine 108 and the hydraulic fluid supply 124, wherein the check valve 136 is configured to allow the second hydraulic machine 108 to access hydraulic fluid from the hydraulic fluid supply 124. As illustrated in FIG. 1, the check valve 136 is arranged to prevent hydraulic fluid from flowing from the first return line 122 to the hydraulic fluid supply 124. The hydraulic fluid supply 124 is here illustrated as a hydraulic tank 124.

Figure 2:
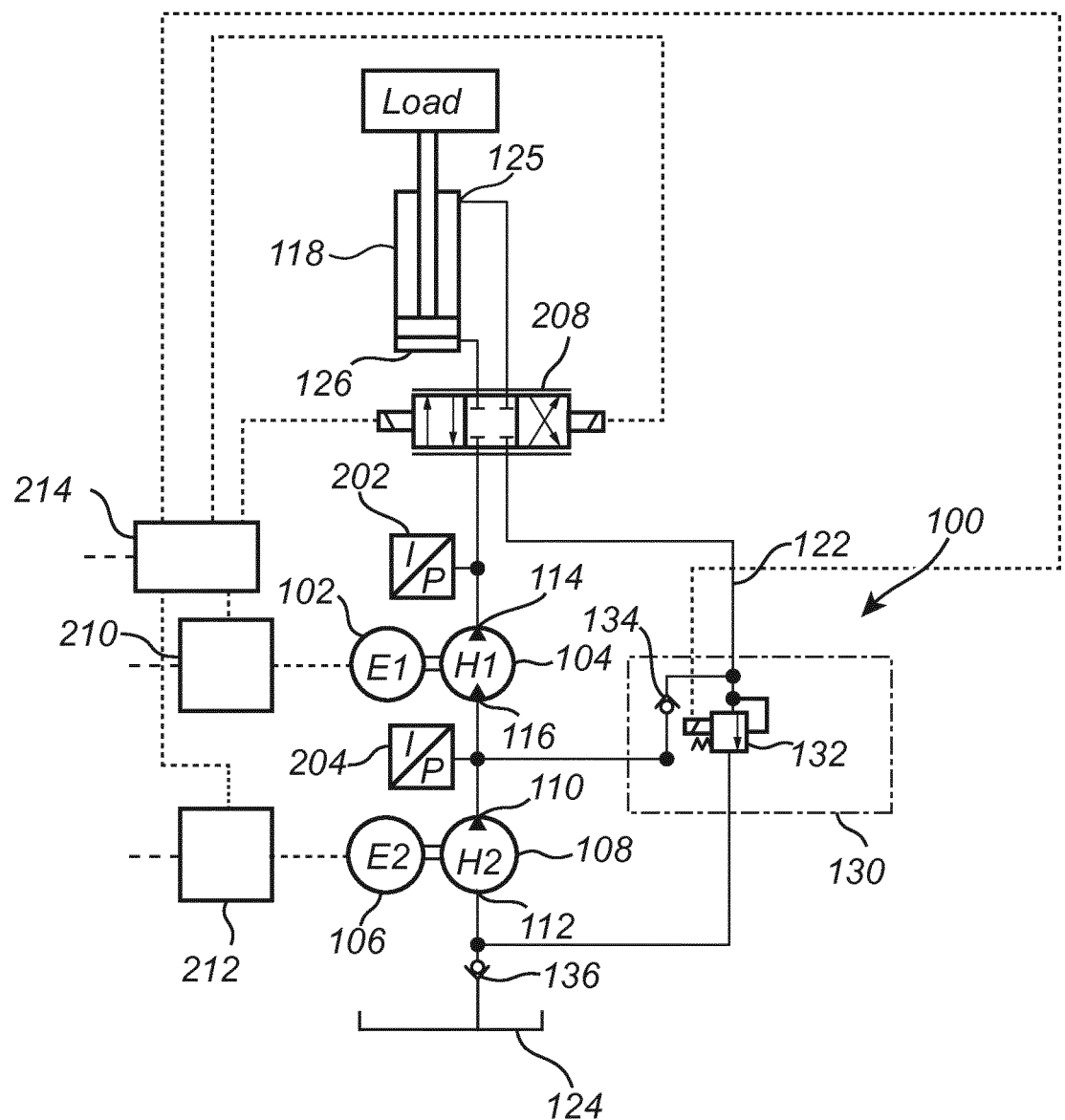
FIG. 2 is a schematic illustration of a hydraulic system according to an embodiment of the invention.

In FIG. 2, it is further illustrated that the hydraulic system 200 comprises first pressure detection means 202 arranged to determine a pressure in the supply line 120 and second pressure detection means 204 arranged to determine a pressure at the input side of the first hydraulic machine. The first and second pressure detection means 202, 204 may for example be pressure sensors arranged in the supply line 120 and first return line 122, respectively.

The hydraulic consumer which is here embodied by a hydraulic cylinder 118 may for example be a steering cylinder, a lift cylinder or a tilt cylinder of a working machine. Moreover, the described valve arrangement 130 can easily be extended with additional valves to accommodate for additional hydraulic consumers by providing one controllable relief valve for each hydraulic consumer. FIG. 2 also illustrates a directional control valve 208 arranged between the hydraulic cylinder 118 and the remainder of the hydraulic system 100.

FIG. 2 further illustrates a first 210 and a second 212 power electronic control unit for controlling the first and second electrical machine 102, 106 respectively. The first 210 and a second 212 power electronic control units are in turn controlled by a hydraulic system control unit 214 which is arranged and configured to control the overall functionality of the hydraulic system 100. The control 214 unit may include a microprocessor, microcontroller, programmable digital signal processor or another programmable device. The control unit 214 may also, or instead, include an application specific integrated circuit, a programmable gate array or programmable array logic, a programmable logic device, or a digital signal processor. Where the control unit 214 includes a programmable device such as the microprocessor, microcontroller or programmable digital signal processor mentioned above, the processor may further include computer executable code that controls operation of the programmable device. Moreover, the control unit may be embodied be a dedicated control unit for the hydraulic system or the desired functionality may be provided by one or more general purpose electronic control units (ECUs).

Figure 3:
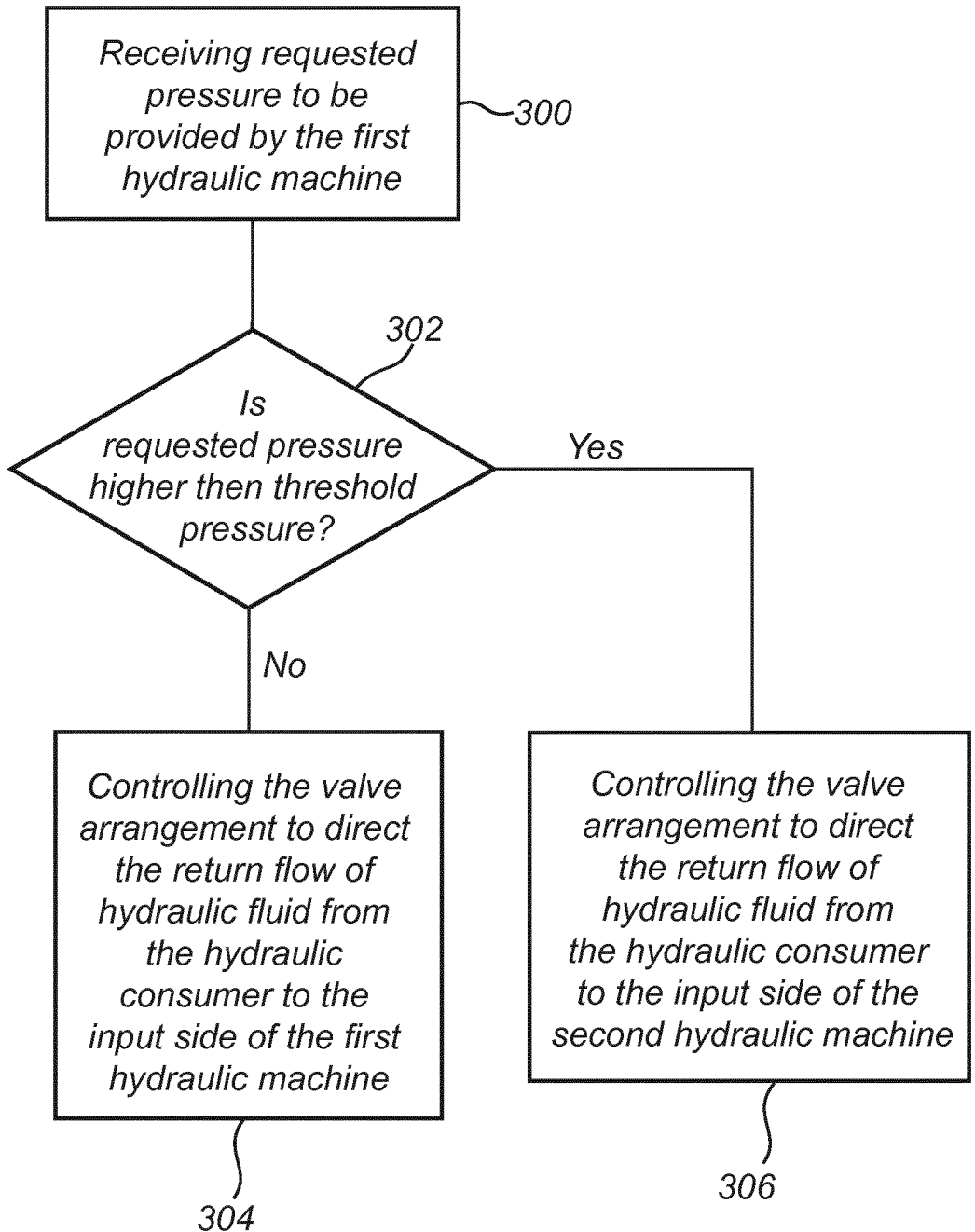
FIG. 3 is a flow chart outlining steps of a method of controlling a hydraulic system according to an embodiment of the invention.

FIG. 3 is a flow chart outlining steps of a method according to embodiments of the invention. The method will be described with reference to the hydraulic system 100 illustrated in FIGS. 1 and 2. In general, the method comprises controlling the valve arrangement 130 to direct a return flow of hydraulic fluid from the hydraulic consumer 118 to either the input side 116 of the first hydraulic machine 104 or to the input side 112 of the second hydraulic machine 112 based on a requested output pressure from the first hydraulic machine 104.

In further detail, the method comprises, receiving 300 a requested pressure to be provided by the first hydraulic machine 104 and determining if 302 the requested pressure is lower or higher than a threshold pressure for the first hydraulic machine 104. If the requested pressure is lower than the threshold pressure, the method comprises controlling 304 the valve arrangement 130 to direct the return flow of hydraulic fluid from the hydraulic consumer 118 to the input side 116 of the first hydraulic machine 104. This means that the pressure request can be fulfilled by the first hydraulic machine 104 and there is no need for added pressure from the second hydraulic machine 108.

If 302 the requested pressure is higher than the threshold pressure, the method comprises controlling 306 the valve arrangement 130 to direct the return flow of hydraulic fluid from the hydraulic consumer 118 to the input side 112 of the second hydraulic machine 108 and controlling the second hydraulic machine 108 to provide a pressurized flow to the input side 116 of the first hydraulic machine 104. Thereby, the output pressure from the first hydraulic machine 104 is the combined pressure of the first and second hydraulic machines, 104, 108.

The valve arrangement 130 is advantageously configured to provide a gradual and smooth transition when the return flow is changed from going to the input side 116 of the first hydraulic machine 104 to instead go to the input side 112 of the second hydraulic machine 108, i.e. when the requested pressure is increased. The gradual transition has the effect that the hydraulic consumer will not experience sudden changes in the supply pressure, which in turn will allow for a smooth movement of a hydraulic cylinder. The pressure of the second hydraulic machine 108 may be increased using a ramp following a transition ramp of the valve arrangement, so that the flow of the first hydraulic machine 104 is similarly ramped to provide a smooth pressure increase for the hydraulic consumer 118.

Figure 4:
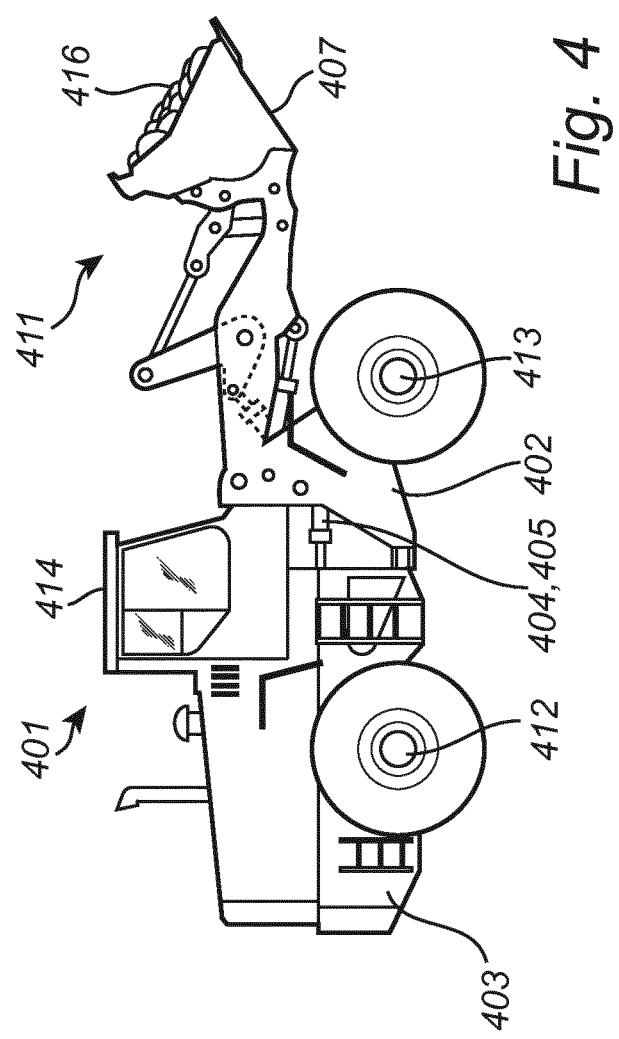
FIG. 4 is a schematic illustration of a working machine comprising a hydraulic system according to an embodiment of the invention.

FIG. 4 shows a frame-steered working machine in the form of a wheel loader 401. The body of the wheel loader 401 comprises a front body section 402 and a rear body section 403, which sections each has an axle 412, 413 for driving a pair of wheels. The rear body-section 403 comprises a cab 414. The body sections 402, 403 are connected to each other in such a way that they can pivot in relation to each other around a vertical axis by means of two first actuators in the form of hydraulic cylinders 404, 405 arranged between the two sections. The hydraulic cylinders 404, 405 are thus arranged one on each side of a horizontal centerline of the vehicle in a vehicle traveling direction in order to turn the wheel loader 401.

The wheel loader 401 comprises an equipment 411 for handling objects or material. The equipment 411 comprises a load-arm unit 406, also referred to as a linkage, and an implement 407 in the form of a bucket fitted on the load-arm unit 406. A first end of the load-arm unit 406 is pivotally connected to the front vehicle section 402. The implement 407 is pivotally connected to a second end of the load-arm unit 406.

The load-arm unit 406 can be raised and lowered relative to the front section 402 of the vehicle by means of two second actuators in the form of two hydraulic cylinders 408, 409, each of which is connected at one end to the front vehicle section 402 and at the other end to the load-arm unit 406. The bucket 407 can be tilted relative to the load-arm unit 406 by means of a third actuator in the form of a hydraulic cylinder 410, which is connected at one end to the front vehicle section 402 and at the other end to the bucket 407 via a link-arm system 415.

It is to be understood that the present invention is not limited to the embodiments described above and illustrated in the drawings; rather, the skilled person will recognize that many changes and modifications may be made within the scope of the appended claims.

The invention claimed is:

1. A hydraulic system for a working machine, the system comprising:
   a first electric machine connected to a first hydraulic machine;
   a second electric machine connected to a second hydraulic machine, an output side of the second hydraulic machine being connected to an input side of the first hydraulic machine;
   at least one hydraulic consumer hydraulically coupled to an output side of the first hydraulic machine via a supply line and configured to be powered by the first hydraulic machine; and
   a valve arrangement arranged between the hydraulic consumer and the first and second hydraulic machines, wherein the valve arrangement is configured to control a return flow of hydraulic fluid from the hydraulic consumer to either the input side of the first hydraulic machine or an input side of the second hydraulic machine based on a requested output pressure from the first hydraulic machine.

2. The hydraulic system according to claim 1, wherein the valve arrangement comprises at least one controllable relief valve.

3. The hydraulic system according to claim 1, wherein the controllable relief valve is an electrically controllable relief valve.

4. The hydraulic system according to claim 1, wherein the valve arrangement is configured to direct the return flow to the input side of the second hydraulic machine if the requested output pressure from the first hydraulic machine exceeds a threshold pressure.

5. The hydraulic system according to claim 4, wherein the valve arrangement is configured to direct the return flow to the input side of the first hydraulic machine if the requested output pressure from the first hydraulic machine is below the threshold pressure.

6. The hydraulic system according to claim 4, wherein the threshold pressure is a maximum output pressure of the first hydraulic machine.

7. The hydraulic system according to claim 1, wherein the second hydraulic machine is configured to provide a pressure to the input side of the first hydraulic machine corresponding to a difference in pressure between the requested output pressure and the threshold pressure of the first hydraulic machine.

8. The hydraulic system according to claim 1, wherein the first and second hydraulic machines are configured such that a combined output pressure from the first and second hydraulic machine is equal to a maximum possible requested pressure from the first hydraulic machine.

9. The hydraulic system according to claim 1, wherein the at least one hydraulic consumer is one of a steering cylinder, a lift cylinder and a tilt cylinder of a working machine.

10. A working machine comprising a system according to claim 1.

11. A method for controlling a hydraulic system of a working machine, the system comprising:
    a first electric machine connected to a first hydraulic machine;
    a second electric machine connected to a second hydraulic machine, an output side of the second hydraulic machine being connected to an input side of the first hydraulic machine;
    at least one hydraulic consumer hydraulically coupled to an output side of the first hydraulic machine via a supply line and configured to be powered by the first hydraulic machine; and
    a valve arrangement arranged between the hydraulic consumer and the first and second hydraulic machines,
    wherein the method comprises:
    controlling the valve arrangement to direct a return flow of hydraulic fluid from the hydraulic consumer to either the input side of the first hydraulic machine or the input side of the second hydraulic machine based on a requested output pressure from the first hydraulic machine.

12. The method according to claim 11, further comprising:
    receiving a requested pressure to be provided by the first hydraulic machine;
    if the requested pressure is lower than a threshold pressure, controlling the valve arrangement to direct the return flow of hydraulic fluid from the hydraulic consumer to the input side of the first hydraulic machine; and if the requested pressure is higher than the threshold pressure, controlling the valve arrangement to direct the return flow of hydraulic fluid from the hydraulic consumer to the input side of the second hydraulic machine and controlling the second hydraulic machine to provide a pressurized flow to the input side of the first hydraulic machine.

13. The method according to claim 12, further comprising, for a requested pressure higher than the threshold pressure, controlling the valve arrangement to gradually redirect the flow from the input side of the first hydraulic machine to the input side of the second hydraulic machine using a ramp.

14. The method according to claim 12, further comprising, for a requested pressure higher than the threshold pressure, controlling the second hydraulic machine to gradually increase an output pressure of the second hydraulic machine to a pressure corresponding to a difference between the requested pressure and the threshold pressure of the first hydraulic machine.

15. The method according to claim 12, wherein the threshold pressure is a maximum output pressure of the first hydraulic machine.

\* \* \* \* \*